March 4, 1924.
F. COATES
CLUTCH
Filed April 27, 1921
1,485,962
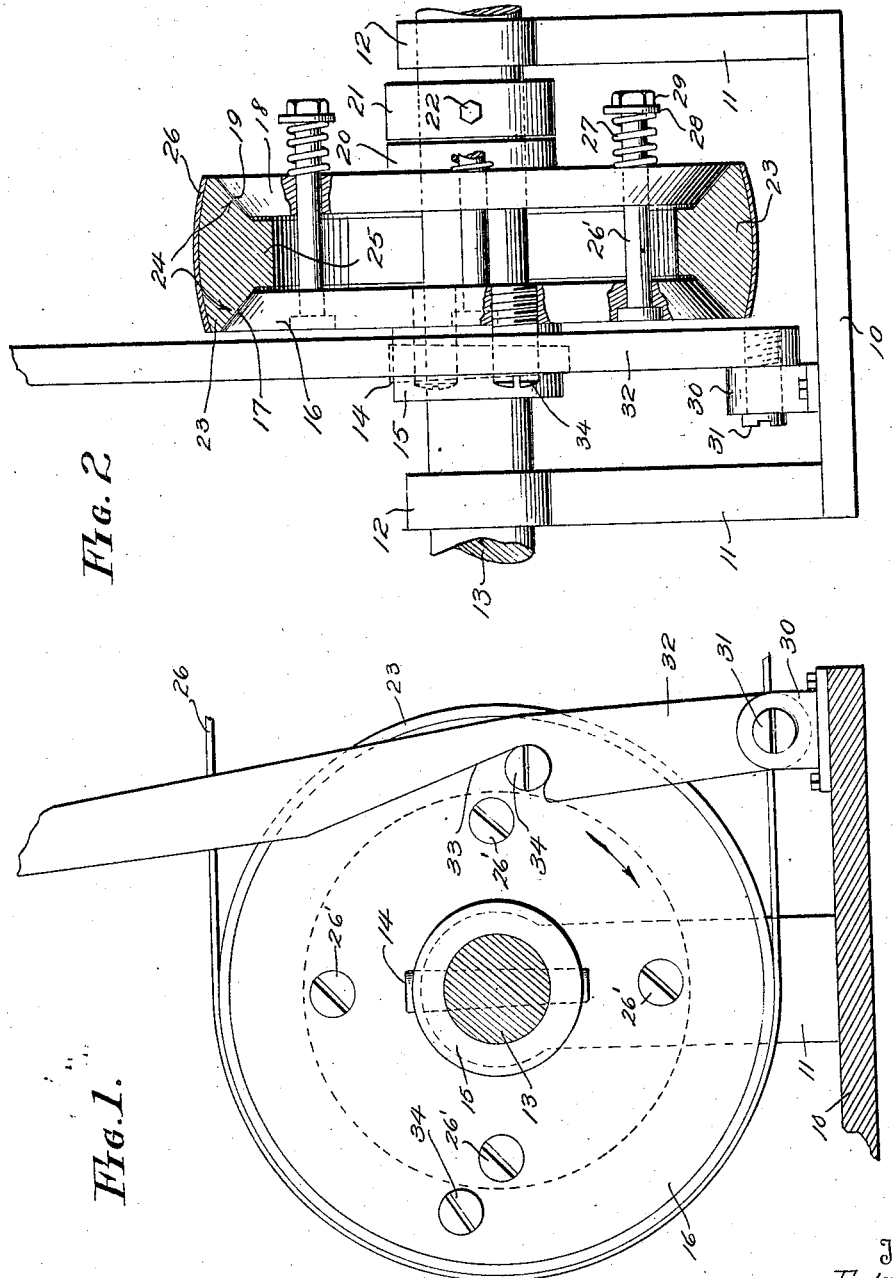
Inventor
Frederick Coates Patented Mar. 4, 1924.

1,485,962

UNITED STATES PATENT OFFICE.

FREDERICK COATES, OF CINCINNATI, OHIO, ASSIGNOR TO FEDERAL PRODUCTS COMPANY, OF CINCINNATI, OHIO, A CORPORATION OF OHIO.

CLUTCH.

Application filed April 27, 1921. Serial No. 464,831.

*To all whom it may concern:*

Be it known that FREDERICK COATES, a citizen of the United States, residing at Cincinnati, in the county of Hamilton and State of Ohio, has invented certain new and useful Improvements in Clutches, of which the following is a specification.

This invention relates to power transmission machinery and has special reference to a slip friction clutch adapted for driving a shaft in such manner that the shaft is normally held against revolution but may be manually released from restraint to temporarily effect turning of such normally quiescent shaft.

One important object of the present invention is to provide an improved form of clutch peculiarly adapted to control the operation of paper can making machinery of the manually controlled type.

A second important object of the invention is to provide an improved form of clutch for a shaft so arranged that the driven shaft may be instantly stopped at the will of the operator upon arrival at a predetermined position.

A third important object of the invention is to provide an improved form of clutch and stop so arranged that the driving torque of the clutch may be varied at will without stopping the revolution of the driving member.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a side view of the clutch taken from the controlling or stopping side thereof.

Figure 2 is an edge view of the clutch, certain parts being shown in section to better disclose the relationship of the elements.

In the embodiment of the invention herein shown and described, and which is typical of various forms in which the device may be embodied, there is disclosed a base 10 from which extend upwards a pair of standards 11 terminating in bearings 12. In these bearings is mounted the shaft 13 which is to be driven.

Fixed on this shaft by means of a tapered pin 14 is a collar 15. This collar constitutes the hub of a friction disk 16 having its periphery bevelled as at 17. Mounted on the shaft 13 is a second friction disk 18 also having its periphery bevelled as at 19, the bevels of the two disks being arranged to face each other. Adjacent the hub 20 of the disk 18 is a collar 21 which is adjustable along the shaft 13 and is secured in adjusted position by means of a set screw 22.

The driving element consists of an annular member 23 which has on each side a bevelled face 24 conforming to the bevels 17 and 19. This driving member is positioned between the two clutch disks so that the bevelled faces of said disks bear against the bevelled faces of the driving member. Between the bevelled faces the driving member is provided with an inwardly extending rib 25. This annular member is driven by the usual belt 26.

In order to produce the proper amount of driving torque as well as to adjust the same, there is provided a series of bolts 26 which are secured by their heads in the disk 16 and project through the disk 18. On the projecting end of each bolt is mounted a compression spring 27 which is held in adjusted compression by means of a washer 28 and nut 29.

On the base 10 is mounted a bracket 30 to which is secured, by a pivot bolt 31, the lower end of a hand lever 32. This lever swings toward and from the shaft 13 and on the side next the shaft 13 is provided with a notch 33 so positioned and formed as to be capable of engaging one or the other of a plurality of stop pins 34 when the lever is moved inward.

In operation the nuts 29 are adjusted so that sufficient pressure is exerted between the driving member and the friction disks to rotate the shaft under the load imposed thereon and it is to be observed that this can be done while the driving member is revolving since the clutch disks can be kept from rotation by engaging the lever 32 with one of the stop pins 34. With the clutch properly adjusted the driving member will revolve under the influence of the belt 26. Whenever it is desired to permit the rotation of the shaft 13 the lever 32 is moved to free it from engagement with the stop pin 34 with which it may be engaged. The shaft will then revolve until the lever is moved toward the shaft whereupon one of the stop pins will engage in the notch 33 and the shaft will thus be instantly stopped.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described but it is wished to include all such as come within the scope claimed.

Having thus described the invention, what is claimed as new, is:—

1. In a clutch, a shaft, a pair of opposed friction disks carried by said shaft, one of said disks being fixed to said shaft, an annular driving member located between said disks and frictionally engaged therewith, said member being arranged for engagement by a driving element, means constantly urging the other clutch disk towards the fixed clutch disk, and means for locking the disks and shaft from movement comprising stop pins on one of said disks and a lever pivoted adjacent the stop pin provided disk and having a notch wherein said stop pins may selectively engage.

2. In a clutch, a shaft, a pair of opposed friction disks carried by said shaft, one of said disks being fixed to said shaft, an annular driving member located between said disks and frictionally engaged therewith, said member being arranged for engagement by a driving element, bolts carried by one of the disks and projecting through the other disk, springs on the projecting ends of said bolts, nuts on said bolts to adjust the tension of said springs, and means for locking the disks and shaft from movement comprising stop pins on one of said disks and a lever pivoted adjacent the stop pin provided disk and having a notch wherein said stop pins may selectively engage.

In testimony whereof I affix my signature.

FREDERICK COATES.